(12) United States Patent
Bonne

(10) Patent No.: US 8,935,083 B2
(45) Date of Patent: Jan. 13, 2015

(54) MOTOR VEHICLE HAVING DRIVE MOTOR AND NAVIGATION SYSTEM

(75) Inventor: Uwe Bonne, Dreieich (DE)

(73) Assignee: GM Global Technology Operations LLC, Detroit, MI (US)

(*) Notice: Subject to any disclaimer, the term of this patent is extended or adjusted under 35 U.S.C. 154(b) by 1240 days.

(21) Appl. No.: 12/527,180

(22) PCT Filed: Jan. 23, 2008

(86) PCT No.: PCT/EP2008/000482
§ 371 (c)(1),
(2), (4) Date: Aug. 13, 2009

(87) PCT Pub. No.: WO2008/098663
PCT Pub. Date: Aug. 21, 2008

(65) Prior Publication Data
US 2010/0087977 A1 Apr. 8, 2010

(30) Foreign Application Priority Data

Feb. 17, 2007 (DE) .......................... 10 2007 007 955

(51) Int. Cl.
*G01C 21/36* (2006.01)
*G01C 21/30* (2006.01)

(52) U.S. Cl.
CPC ........ *G01C 21/3697* (2013.01); *G01C 21/3676* (2013.01)
USPC ............. 701/123; 701/22; 701/118; 701/428; 701/423

(58) Field of Classification Search
CPC ........................ G01C 21/3676; G01C 21/3697
See application file for complete search history.

(56) References Cited

U.S. PATENT DOCUMENTS

| | | | | |
|---|---|---|---|---|
| 5,568,390 A | * | 10/1996 | Hirota et al. | 701/410 |
| 5,913,917 A | * | 6/1999 | Murphy | 701/123 |
| 6,026,346 A | * | 2/2000 | Ohashi et al. | 701/416 |
| 6,453,731 B1 | * | 9/2002 | Yaegashi | 73/114.52 |
| 6,895,320 B2 | * | 5/2005 | Bauer et al. | 701/54 |
| 7,668,644 B2 | * | 2/2010 | Tengler et al. | 701/123 |
| 7,925,426 B2 | * | 4/2011 | Koebler et al. | 701/123 |
| 8,036,785 B2 | * | 10/2011 | Maguire et al. | 701/22 |
| 8,055,439 B2 | * | 11/2011 | Ji et al. | 701/123 |
| 2005/0055157 A1 | * | 3/2005 | Scholl | 701/207 |
| 2007/0005237 A1 | * | 1/2007 | Needham et al. | 701/202 |
| 2007/0021909 A1 | * | 1/2007 | Matsuda | 701/208 |
| 2007/0143002 A1 | * | 6/2007 | Crowell et al. | 701/123 |
| 2007/0262855 A1 | * | 11/2007 | Zuta et al. | 340/439 |
| 2011/0060495 A1 | | 3/2011 | Kono et al. | |

FOREIGN PATENT DOCUMENTS

| | | |
|---|---|---|
| DE | 3000588 A1 | 7/1981 |
| DE | 19941970 A1 | 3/2001 |
| EP | 1239265 A2 * 11/2002 | ............ G01C 21/20 |
| EP | 1505555 A1 | 2/2005 |
| EP | 1538426 A1 | 6/2005 |

(Continued)

*Primary Examiner* — Helal A Algahaim
*Assistant Examiner* — Charles J Han
(74) *Attorney, Agent, or Firm* — Ingrassia Fisher & Lorenz, P.C.

(57) ABSTRACT

A motor vehicle has a drive motor and a navigation system having a display for displaying a map image. The power consumption is displayable on the map image to optimize the power consumption of the drive motor.

18 Claims, 2 Drawing Sheets

(56) References Cited

FOREIGN PATENT DOCUMENTS

| EP | 1544575 | A1 | 6/2005 |
| EP | 102009036673 | A1 | 2/2011 |
| EP | 2295935 | A1 | 3/2011 |
| JP | 2002350152 | A | 12/2002 |

* cited by examiner

MOTOR VEHICLE HAVING DRIVE MOTOR AND NAVIGATION SYSTEM

CROSS-REFERENCE TO RELATED APPLICATIONS

This application is a U.S. National-Stage entry under 35 U.S.C. §371 based on International Application No. PCT/EP2008/000482, filed Jan. 23, 2008, which was published under PCT Article 21(2) and which claims priority to German Application No. 102007007955.0, filed Feb. 17, 2007, which are all hereby incorporated in their entirety by reference.

TECHNICAL FIELD

The invention relates to a motor vehicle having a drive motor and a navigation system having a display for displaying a map image.

BACKGROUND

Motor vehicles have a drive motor, for example, in the form of an internal combustion engine, an electric motor, or a combination thereof. The drive motor consumes power to generate the desired propulsion, a higher power requirement typically being needed during more rapid travel than during slower travel. A hill climb also requires more power than a hill descent, during which energy can even be reclaimed using an electric motor and/or a generator.

Furthermore, motor vehicles are frequently either equipped at the factory or are retrofitted with a navigation system, in order to ascertain the most favorable possible travel route to a destination predetermined by the user from a starting point or the current position, which is ascertained using the GPS system or, in the future, the Galileo system. For the navigation, corresponding driving instructions are output visually and/or acoustically. To display the driving instructions, displaying a map image on a display or display screen of the navigation system and/or the onboard computer is known. The surrounding landscape can either be shown schematically or approximately realistically. For illustration, the driving route to be covered is emphasized by color in the map image, for example, as a green driving route, in addition, direction specifications, such as arrows or the like, being able to be overlaid in order to illustrate turning onto a street, inter alia.

Furthermore, motor vehicles are frequently equipped with a display device (e.g., in the form of a digital display), in order to indicate power or fuel consumption.

A display device for the fuel consumption of motor vehicles is known from DE 30 00 588 A1, in which the level of the fuel consumption is shown via an illuminated band. The higher the fuel consumption, the greater the illuminated area of the illuminated band. Furthermore, a digital display for the total consumed fuel is provided.

Furthermore, DE 199 41 970 A1 discloses a method and a device for recording and displaying consumption and driving data of a motor vehicle, a current fuel consumption being displayed on a separate display device. In addition, the summation of the total consumed fuel is possible. Average consumption values may also be ascertained over a longer usage time and displayed.

Finally, EP 1 538 426 A1 describes a method for improving the reproducibility upon consumption measurements of a motor vehicle. Various variables which have an influence on the fuel consumption are processed using a neuronal network, in order to obtain simulated output variables via a standardized target driving curve. This method is solely suitable for measurements on roller test stands.

The known motor vehicles are disadvantageous in that a desired driving destination can be reliably reached using an existing navigation system, but a further display device, possibly having a separate control unit, must always be provided to optimize the fuel consumption. In addition, the driver can be significantly distracted from traffic by reading this display device, for example, a digital display.

It is at least one object of the invention to provide a motor vehicle of the type cited at the beginning, using which the lowest possible power consumption during the travel of a travel route proposed by the navigation system can be implemented. In addition, other objects, desirable features, and characteristics will become apparent from the subsequent summary and detailed description, and the appended claims, taken in conjunction with the accompanying drawings and this background.

SUMMARY

The object is achieved according to the invention in that a power consumption of the drive motor is displayable on the map image.

Using a navigation system implemented in this way in a motor vehicle, it is possible to show the current power consumption on the display of the navigation system and/or in the displayed map image. The power consumption can either be a fuel consumption and/or the electrical power which is taken from a power accumulator. The driver, when he looks at the displayed map image, in order to clarify his current position and the further direction to be followed, can thus immediately also register the current fuel consumption, in order to adapt his mode of driving for lower power consumption if needed. It is also included in the scope of the invention that the display of the power consumption is performed via an acoustic speech message, which is optionally repeated at specific time intervals and/or also changes in the event of a changed mode of driving.

The advantage of the invention is that an additional display device for the power consumption is dispensed with, because the current power consumption is displayed on an already existing display of the navigation system. Corresponding signals about the power consumption are provided in a central control unit of the motor vehicle, for example, and may be relayed to the navigation system for processing, which is designed having appropriate hardware and/or software for processing the consumption data.

In a simple way, the current power consumption or fuel consumption may be shown by a numeric representation. For example, a consumption quantity in liters per 100 km is associated with the cursor, which typically shows the motor vehicle on the map image of the navigation system. This numeric specification may change continuously according to the actual power consumption. Preferably, however, the current power consumption is implemented by coloring the driving route covered in the display of the map image. For example, a very energy-saving mode of driving having a lesser power consumption may be shown by a green color of the route section covered, a normal mode of driving by a yellow color, and a power-consuming mode of driving by a red color. The level of the power consumption can be related to an average value, for example, which results from various consumption values in the event of various velocities and driving situations. If the actual consumption deviates by 10% upward or downward, for example, the driving route can be shown colored red or green in each case. Of course, the route sections covered may be divided into small sections of 1 km in length each, for example, so that a red color is shown on a hill-climbing route section and a green color is shown on a subsequent hill-descending route section.

According to a refinement, the map, which is shown on the display of the navigation system, is a two-dimensional map image or a three-dimensional map image. In a two-dimensional representation, the surrounding landscape is shown more or less as if vertically from above. In a three-dimensional or pseudo-three-dimensional representation, the surroundings are shown from an elevated position in perspective forward in the travel direction, in particular hilly route sections which are to be traveled being able to be identified as such. Accordingly, the driver can establish when looking at the display that, for example, the power consumption must necessarily be higher during a hill climb, so that a red color possibly existing here is not necessarily to be attributed to an un-ecological mode of driving. Of course, the representations may either be implemented schematically or essentially realistically.

A height profile of the travel route which has been covered and/or is still to be performed is expediently shown. Using such a representation, the travel route is more or less shown in a side view, with the hill climbs to be performed being clearly visible in particular. Changing over to a representation of this type may be performed, inter alia, using an actuating element on the display of the navigation system.

To clarify the reason for high or low power consumption, the type of road which has been traveled can also be shown. Thus, it is obvious that during freeway travel at essentially constant velocity, a lower power consumption will exist in any case than on a narrow, curvy route, in which the same average velocity can be achieved, but strong braking and acceleration maneuvers are necessary for this purpose. The types of road traveled, such as freeway, rural road, hilly route, main through road, or the like, may each be shown by separate symbols or colors, inter alia.

In the same way, the particular velocities or average velocities on individual traveled route sections may be shown, for example, by numbers, symbols, or further colors, in order to be able to analyze after traveling the route whether a particularly ecological mode of driving is to be attributed to a long route section having been traveled constantly at equal velocity. It can also be ascertained there from whether a power consumption can be optimized by adapting the velocity.

If the motor vehicle is used by various drivers, these data may preferably be stored in personalized form, whereby a driver can analyze all routes traveled by him after a longer period of time, for example, as to how he optimizes his power consumption.

In order to be able to implement the most favorable possible power consumption predictively for a travel route still to be covered, in a further design, in particular, multiple alternative travel routes from a starting point to a destination, each having different colors for different power consumption values to be expected, can be displayed. For example, a destination can be achieved via a mountainous travel route, so that there is significant power consumption at least on the climbs. Alternatively, the destination may also be achieved by driving around the mountain range in the plane, less power typically being necessary for this purpose. Of course, the total lengths of the particular travel routes may also be taken into consideration in the coloring, because higher power consumption may nonetheless be expected from the long, flat travel route than from a short, mountainous travel route, for example. The user can thus select among various alternatives taking the power consumption to be expected and the types of roads and/or route lengths to be traveled into consideration. The corresponding data about height profiles and the type of the roads to be traveled, which also have an influence on the power consumption, are provided in the navigation system, for example, stored on a CD-ROM.

According to a refinement, a control unit ascertains the optimum power consumption for an upcoming stretch of road, in particular for a hill climb, and shows the actual power consumption identified by color as a function of the optimum power consumption. On the basis of the route profile and ascertained and stored power consumption characteristic curves, optimal power consumption for a specific stretch of road can also be ascertained. If the actual power consumption is in the range, which is provided with a tolerance, of the optimal power consumption, the actual power consumption is shown in a green color, for example. If the actual power consumption is above the calculated optimal power consumption, the display is performed, for example, in orange to bright red color, as a function of the level by which it is exceeded. Of course, it is also possible to select only the colors green and red for the display.

It is obvious that the above-mentioned features and the features explained hereafter are usable not only in the particular specified combination but rather also in other combinations. The scope of the invention is only defined by the claims.

BRIEF DESCRIPTION OF THE DRAWINGS

The present invention will hereinafter be described in conjunction with the following drawing figures, wherein like numerals denote like elements, and.

DETAILED DESCRIPTION

The following detailed description is merely exemplary in nature and is not intended to limit application and uses. Furthermore, there is no intention to be bound by any theory presented in the preceding background or summary or the following detailed description.

Figure 1:
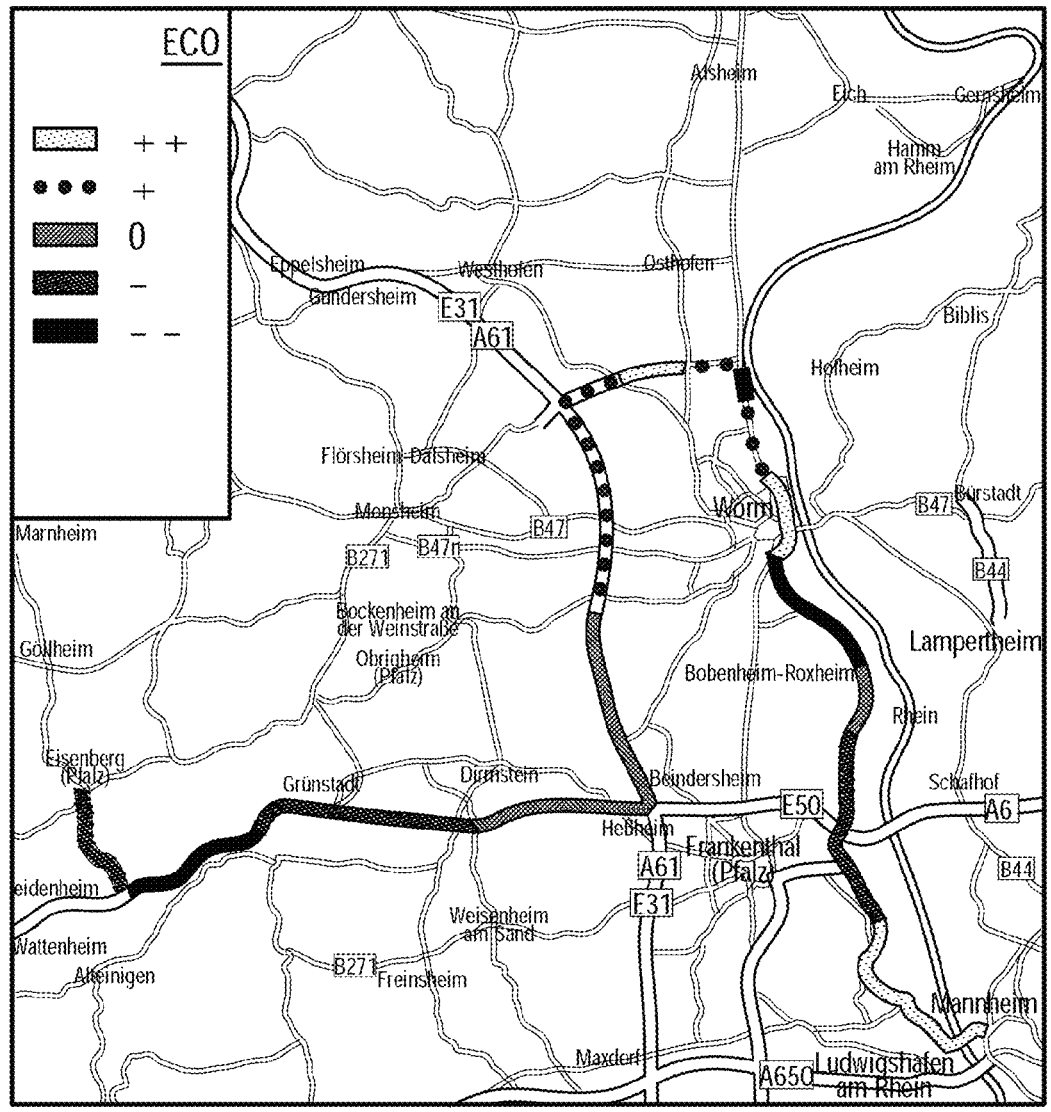
FIG. 1 shows a two-dimensional map image of various route sections of a navigation system of a motor vehicle according to the invention.

A schematic representation of a traveled route is recognizable in FIG. 1, freeways and state roads being noted by their particular numbers and locations being noted by their names. The travel has begun in Eisenberg, traveled via the A6, via the freeway intersection at Frankenthal, via the A61, and subsequently via rural and state roads to Mannheim. Particular different power consumption values on individual route sections may be inferred from the different symbols and/or line representations on the freeways, the rural roads, and the state roads. Thus, during the trip from Eisenberg in the direction of Wattenheim, a power consumption which was slightly increased from a normal value, ascertained by computer on the basis of a characteristic curve, for example, was implemented and subsequently in the direction of Grünstadt both a relatively higher and also an increased power consumption was implemented (e.g., because of a rapid mode of driving), as is obvious from the dark color and the dark color having light spots. Subsequently, driving was performed at a power consumption which corresponded to the normal value and sometimes fell significantly below the normal value. After Worms, the power consumption reached a comparatively high value, which sank to the normal value at Bobenheim-Roxheim and subsequently rose slightly again, because the average velocity was increased somewhat, for example. The last route section was covered at a very low power consumption, as shown by the light line having dark spots. After ending the trip, the driver can establish on which route sections he drove ecologically advantageously. Of course, such a representation can also be selected for route sections still to be traveled, if a hilly travel route having increased power consumption is to be expected, for example.

Figure 2:
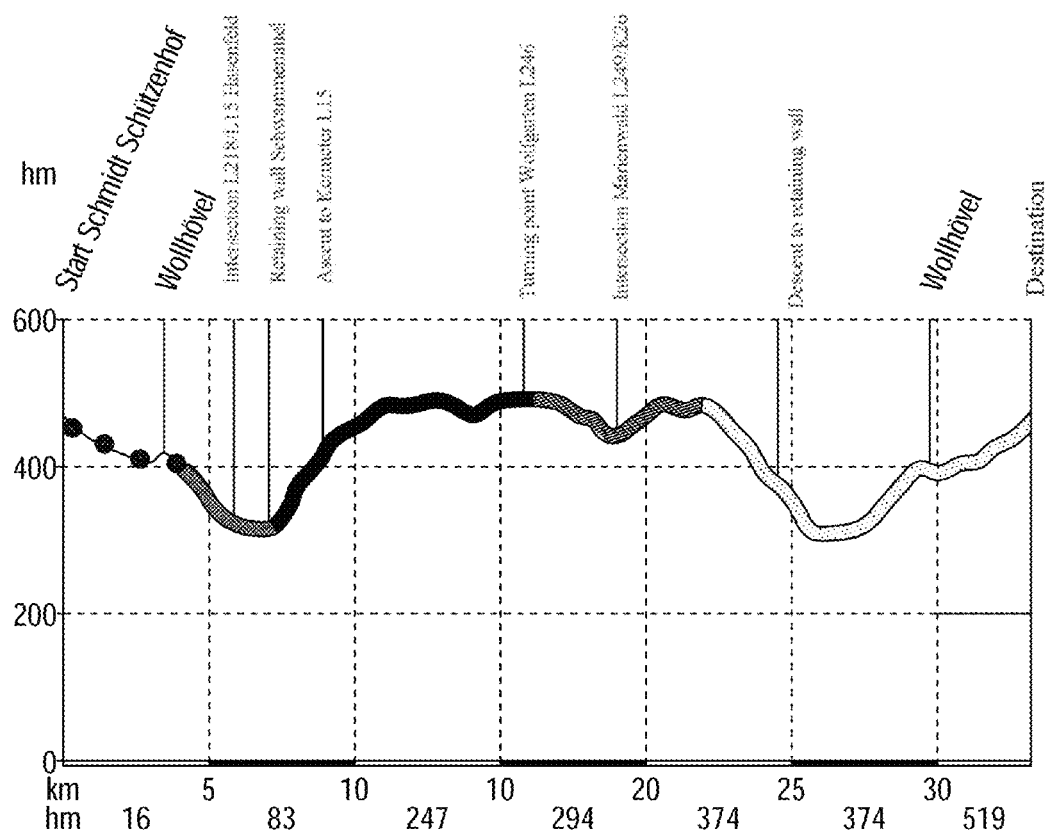
FIG. 2 shows a height profile of a traveled route.

The height profile of a traveled route shown in FIG. 2, for example, from Schützenhof to Wollhövel here, can be obtained by changing over the display mode of the navigation system. There was a high power consumption in particular during the "ascent to Kermeter", because a motor vehicle naturally consumes more power uphill. This is shown by a dark color, for example, red on a display. In contrast, during the steep hill descent to Staumauer, a particularly energy-saving mode of driving was implemented, as illustrated by the light line having dark spots, which can be shown green on a display. In other areas, modes of driving which consumed different amounts of energy existed, these areas are colored correspondingly. It can also be inferred from this illustration that the high or low power consumption is substantially predetermined by the route profile, and not because of a particularly good or poor mode of driving of the driver.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

The invention claimed is:

1. A motor vehicle, comprising:
    a navigation system having a display for displaying a map image, including a travel route of the vehicle,
    wherein a current power consumption of the drive motor is superimposed on the travel route of the vehicle on the map image of the display.

2. The motor vehicle according to claim 1, wherein the current power consumption is displayable using numbers.

3. The motor vehicle according to claim 1, wherein the map image is a two-dimensional map image.

4. The motor vehicle according to claim 1, wherein a height profile of a travel route is displayable on the map image of the display.

5. The motor vehicle according to claim 1, wherein a type of traveled roads is displayable on the map image of the display.

6. The motor vehicle according to claim 1, wherein a velocity range is displayable on the map image of the display.

7. The motor vehicle according to claim 1, wherein a plurality of traveled routes are storable in the navigation system in a personalized form.

8. The motor vehicle according to claim 1, wherein a power consumption expected for an upcoming travel route is displayable on the map image of the display.

9. The motor vehicle according to claim 8, wherein a control unit is adapted to ascertain an optimum power consumption for an upcoming stretch of the travel route, and the image of the display is adapted to display an actual power consumption identified by a color as a function of the optimum power consumption.

10. The motor vehicle according to claim 1, wherein the current power consumption is presented as a speech communication.

11. The motor vehicle according to claim 1, wherein the current power consumption is displayable using colors.

12. The motor vehicle according to claim 1, wherein the map image is a three-dimensional map image.

13. The motor vehicle according to claim 1, wherein the velocities along particular travel routes are stored to analyze whether power consumption can be optimized.

14. The motor vehicle according to claim 13, wherein the velocities along particular travel routes are stored in personalized form.

15. A navigation system for a motor vehicle, the system comprising:
    a display for displaying a travel route of the vehicle,
    wherein a height profile of the travel route is displayable on the display,
    wherein a current power consumption of a drive motor is superimposed on the travel route of the vehicle on a map image of the display.

16. The navigation system according to claim 15, wherein the display of the power consumption is implemented by coloring the travel route various colors based on a level of power consumption.

17. The motor vehicle according to claim 15, wherein the velocities along particular travel routes are stored to analyze whether power consumption can be optimized.

18. The motor vehicle according to claim 17, wherein the velocities along particular travel routes are stored in personalized form.

* * * * *